(12) United States Patent
Ban et al.

(10) Patent No.: US 8,787,260 B2
(45) Date of Patent: Jul. 22, 2014

(54) ADAPTIVELY CONTROLLING PREFIX LENGTH

(75) Inventors: Tae-Won Ban, Gyeonggi-do (KR); Chang-Yong Ahn, Gyeonggi-do (KR); Sung-Sang You, Seoul (KR); Hyun-Beom Lee, Seoul (KR); Hee-Jun Lee, Seoul (KR); Byoung-Jin Choi, Gyeonggi-do (KR)

(73) Assignee: KT Corporation, Gyeonggi-do (KR)

(*) Notice: Subject to any disclaimer, the term of this patent is extended or adjusted under 35 U.S.C. 154(b) by 207 days.

(21) Appl. No.: 13/447,349

(22) Filed: Apr. 16, 2012

(65) Prior Publication Data

US 2012/0263108 A1    Oct. 18, 2012

(30) Foreign Application Priority Data

Apr. 15, 2011    (KR) .................. 10-2011-0035371

(51) Int. Cl.
*H04W 4/00* (2009.01)
*H04L 12/66* (2006.01)

(52) U.S. Cl.
USPC .......................................... 370/328; 370/355

(58) Field of Classification Search
USPC ................................................ 370/328, 355
See application file for complete search history.

(56) References Cited

U.S. PATENT DOCUMENTS

| | | | |
|---|---|---|---|
| 7,145,890 B1 | 12/2006 | Seo et al. | |
| 7,596,181 B2 | 9/2009 | Chang et al. | |
| 8,248,911 B2 | 8/2012 | Kim et al. | |
| 2003/0165113 A1* | 9/2003 | Hudson | 370/208 |
| 2006/0013325 A1 | 1/2006 | Agrawal et al. | |
| 2007/0097938 A1 | 5/2007 | Nylander et al. | |
| 2008/0146226 A1 | 6/2008 | Claussen et al. | |
| 2009/0122771 A1* | 5/2009 | Cai | 370/338 |
| 2009/0181672 A1 | 7/2009 | Horn et al. | |
| 2009/0182871 A1 | 7/2009 | Gupta et al. | |
| 2009/0239533 A1 | 9/2009 | Somasundaram et al. | |
| 2009/0290652 A1 | 11/2009 | Rezaiifar et al. | |
| 2010/0069062 A1 | 3/2010 | Horn et al. | |
| 2010/0210288 A1 | 8/2010 | Kim et al. | |
| 2010/0227627 A1 | 9/2010 | Ishii et al. | |
| 2011/0014920 A1 | 1/2011 | Nylander et al. | |
| 2011/0149771 A1 | 6/2011 | Abeta et al. | |
| 2011/0300870 A1 | 12/2011 | Chun et al. | |

FOREIGN PATENT DOCUMENTS

| | | | | |
|---|---|---|---|---|
| EP | 2259645 A1 * | 12/2010 | | H04W 72/04 |
| JP | 2009-077368 A | 4/2009 | | |
| KR | 10-2001-0017137 A | 3/2001 | | |
| KR | 10-2006-0051391 A | 5/2006 | | |
| KR | 10-2007-0050339 A | 5/2007 | | |
| KR | 10-2008-0085321 A | 9/2008 | | |
| KR | 10-2009-0099058 A | 9/2009 | | |

(Continued)

*Primary Examiner* — Kenny Lin
(74) *Attorney, Agent, or Firm* — IP Legal Services, LLC

(57) ABSTRACT

Provided are apparatus and method for setting a cyclic prefix length according to a type of a base station. The apparatus may include a memory, a receiver, a selector, and an inserter. The receiver may be configured to store and to manage a plurality of prefix lengths associated with base station types. The receiver may be configured to receive base station information from a base station. The selector may be configured to select a prefix length from the plurality of prefix length based on the received base station information. The inserter may be configured to insert a cyclic prefix having the determined prefix length in a guard interval of a transmission frame.

16 Claims, 3 Drawing Sheets

(56) References Cited

FOREIGN PATENT DOCUMENTS

| | | |
|---|---|---|
| KR | 10-2010-0009932 A | 1/2010 |
| KR | 10-2010-0016881 A | 2/2010 |
| KR | 10-2010-0018309 A | 2/2010 |
| KR | 10-2010-0046492 A | 5/2010 |
| KR | 10-2010-0092855 A | 8/2010 |
| KR | 10-2010-0096015 A | 9/2010 |
| KR | 10-2010-0123078 A | 11/2010 |
| KR | 10-2010-0129315 A | 12/2010 |
| KR | 10-2010-0132845 A | 12/2010 |
| KR | 10-2011-0010121 A | 1/2011 |
| KR | 10-2012-0034217 A | 4/2012 |

* cited by examiner

ADAPTIVELY CONTROLLING PREFIX LENGTH

CROSS REFERENCE TO PRIOR APPLICATIONS

The present application claims priority under 35 U.S.C. §119 to Korean Patent Application No. 10-2011-0035371 (filed on Apr. 15, 2011), which is hereby incorporated by reference in its entirety.

FIELD OF THE INVENTION

The present invention relates to setting up a prefix and, in particular, to an adaptively setting up a cyclic prefix length according to a type of a base station.

BACKGROUND OF THE INVENTION

In an Orthogonal Frequency Division Multiplexing (OFDM) wireless communication system, two parties communicate with each other by transmitting OFDM symbols. OFDM symbols may interfere with each other while the OFDM symbols are being transmitted. For example, Inter-symbol Interference (ISI) commonly occurs in OFDM communication. In order to eliminate such ISI, a guard interval is typically interposed between two OFDM symbols.

The guard interval may eliminate the ISI but cause another interference such as inter-carrier interference (ICI). The ICI occurs because no signal is present during the guard interval and orthogonality between sub-carriers is interrupted. That is, ICI results since orthogonality between sub-carriers is not maintained during the interval. In order to eliminate the ICI, a cyclic prefix is inserted during the guard interval of a transmission frame. The cyclic prefix is typically a copy of a last portion of an OFDM symbol.

A length of a cyclic prefix may be determined based on delay spread that may be caused by multipath of a radio signal in a wireless communication environment. In a mobile communication environment, delay spread increases in proportion to a radius of a cell. For example, since a femtocell has a radius much smaller than that of a macrocell, delay spread of a femtocell is very small as compared to that of a macrocell.

As the cyclic prefix becomes longer, more resources including time and transmission power are required. Accordingly, a length of a cyclic prefix should be carefully designed according to a wireless cell radius. For example, if a cyclic prefix length was set up for a macrocell and a mobile terminal uses the cyclic prefix length for a femtocell without modification, time and transmission power is generally wasted.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a length of a prefix may be adaptively determined according to a type of a base station.

In accordance with another aspect of the present invention, a cyclic prefix length may be controlled adaptively according to a radius of a cell.

In accordance with another aspect of the present invention, a cyclic prefix length may be adaptively set up according to transmission power of an associated base station.

In accordance with an exemplary embodiment of the present invention, a method may be provided for adaptively setting a prefix length in communication with a base station. The method may include receiving base station information from the base station, determining the prefix length based on the received base station information, and inserting a cyclic prefix in a transmission frame with the determined prefix length.

The determining may include determining a type of the base station based on the received base station information, and setting the prefix length according to the type of the base station.

The setting the prefix length may include setting a comparatively short prefix length when the type of the base station is a femtocell base station, and setting a comparatively long prefix length when the type of the base station is a macrocell base station.

The determining the type of the base station is based on at least one of a base station identifier, a cell identifier, and a zone indicator, included in the received base station information.

The determining the prefix length may include determining a communication distance of the base station based on the received base station information, and setting the prefix length differently according to the determined communication distance of the base station.

The setting the prefix length may include setting a comparatively short prefix length when the communication distance is comparatively short, and setting a comparatively long prefix length when the communication distance is comparatively long.

The communication distance may be determined based on at least one of transmission power of the base station, a cell radius of the base station, delay spread in a cell of the base station, and a cell identifier of the base station, which are included in the received base station information.

The inserting the cyclic prefix may include copying a portion of a symbol of the determined prefix length, and inserting the copied portion in a guard interval of the transmission frame.

A length of the guard interval may be maintained constantly regardless of the determined prefix length.

The cyclic prefix may be a cyclic prefix of an OFDM wireless communication system.

In accordance with another embodiment of the present invention, a method may be provided for adaptively setting a prefix length. The method may include receiving base station information from a base station, selecting at least one from a plurality of prefix lengths based on the received base station information, and inserting a cyclic prefix in a transmission frame with the selected prefix length and transmitting signals using the transmission frame.

The method may further include, prior to the receiving, determining the plurality of prefix lengths according to a type of the base station, and storing the plurality of The selecting may include determining a type of the base station based on the received base station information, and selecting as the prefix length a prefix length associated with the determined type of the base station from the plurality of prefix lengths stored in the memory.

The plurality of prefix lengths may be stored as a prefix length set, the method comprising mapping each prefix length to each type of a base station.

The received base station information may include information of at least one of transmission power, a cell radius, a base station identifier, a cell identifier associated with the base station, delay spread in a cell of a base station, and a zone indicator The determining may include determining a comparatively short prefix length for a femtocell base station and mapping the comparatively short prefix length to the femtocell base station, and determining a comparatively long prefix length for a macrocell base station and mapping the comparatively long prefix length to a macrocell base station.

The selecting may include determining a type of the base station based on at least one of a cell identifier, a base station identifier, and a zone indicator, which are included in the received base station, and finding a prefix length mapped to the determined type of the base station from the plurality of prefix lengths stored in the memory.

In accordance with another embodiment of the present invention, an apparatus may be provided for adaptively setting a prefix length. The apparatus may include a memory, a receiver, a selector, and an inserter. The memory may be configured to store and to manage a plurality of prefix lengths associated with base station types. The receiver may be configured to receive base station information from a base station. The selector may be configured to select a prefix length from the plurality of prefix length based on the received base station information. The inserter may be configured to insert a cyclic prefix having the determined prefix length in a guard interval of a transmission frame.

The plurality of prefix lengths may be previously determined by determining a comparatively short prefix length for a femtocell base station and mapping the comparatively short prefix length to the femtocell base station, and determining a comparatively long prefix length for a macrocell base station and mapping the comparatively long prefix length to a macrocell base station. The plurality of predetermined prefix lengths may be stored in the memory in as a prefix length set.

The selector may be configured to determine the base station type based on at least one of a base station identifier, a cell identifier, and a zone indicator, included in the received base station information. The selector may be configured to find a prefix length mapped to the determined base station type from the plurality of prefix lengths stored in the memory.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
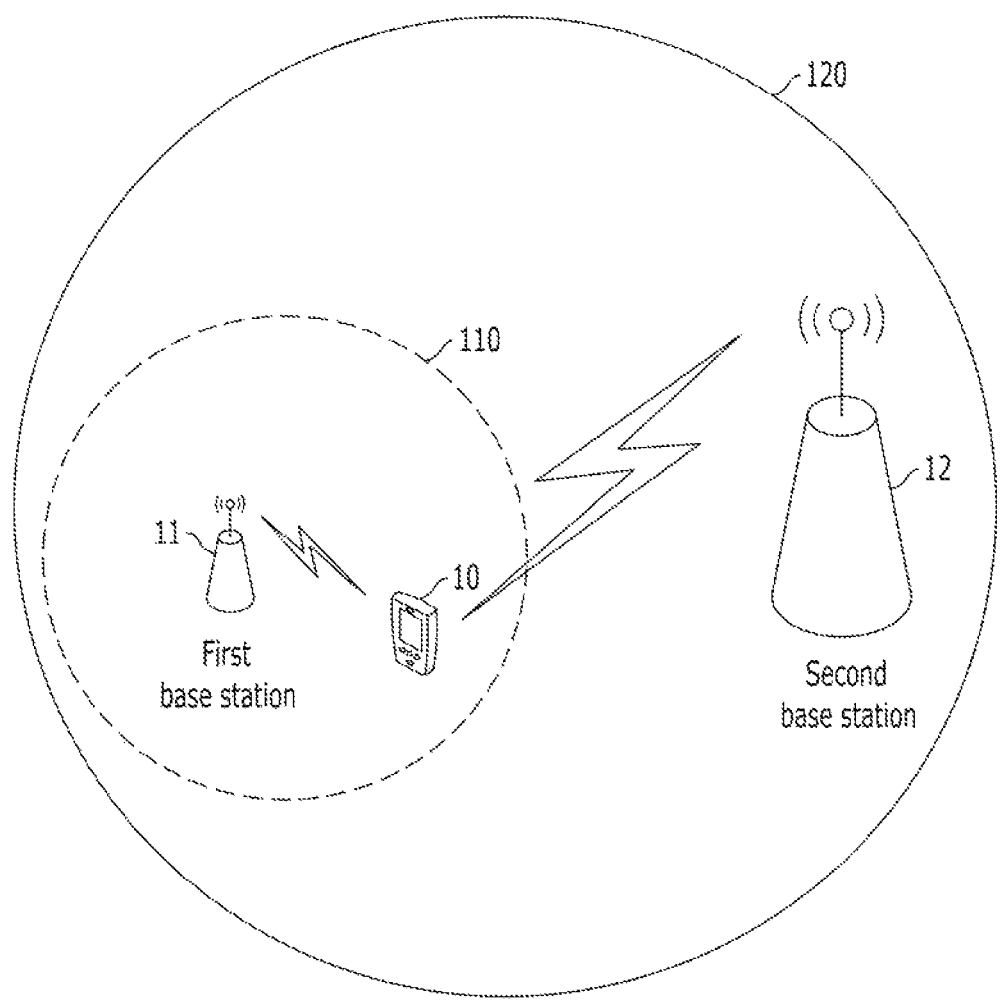
FIG. 1 shows a wireless communication system employing embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 shows a wireless communication system employing embodiments of the present invention.

Referring to FIG. 1, a wireless communication system may include mobile terminal 10 and first and second base stations 11 and 12. Mobile terminal 10 may be a wireless device that accesses first and second base stations 11 and 12 wirelessly in order to communicate with another party. Such mobile terminal 10 may include, but is not limited to, a mobile station, user equipment, a subscriber station, a portable subscriber station, and an access terminal. In accordance with an embodiment of the present invention, mobile terminal 10 may include entire functions or a part of functions of the mobile station, the user equipment, the subscriber station, the portable subscriber station, and the access terminal.

Furthermore, first and second base stations 11 and 12 may include, but is not limited to, an access point, a radio access station, a NodeB, an Evolved Node-B, a base transceiver station, and a mobile multihop relay base station. In accordance with an embodiment of the present invention, first and second base stations 11 and 12 may include entire functions or some of functions of the access point, the radio access station, the NodeB, the Evolved Node-B, the base transceiver station, and the mobile multihop relay base station.

First base station 11 may control and manage resources and entities in associated cell 110. Second base station 12 may control and manage resources and entities in associated cell 120. Cell 110 of first base station 11 may overlap cell 120 of second base station. Accordingly, second base station 12 may control and manage first base station 11. For example, first base station 11 may be a femtocell base station and second base station 12 may be a macrocell base station. The femtocell base station may manage a service area narrower than that of the macrocell base station.

Mobile terminal 10 may access at least one of first and second base stations 11 and 12 in order to communicate with another party through a wireless link. Particularly, mobile terminal 10 may employ or otherwise insert a cyclic prefix in a guard interval of a transmission frame in order to eliminate various types of interferences, such as ISI and ICI. Mobile terminal 10 may copy a last portion of a symbol and uses the copied portion as a cyclic prefix.

The length of the cyclic prefix may be determined based on delay spread that might be caused by multipath characteristics of a radio signal. The delay spread may increase in proportional to a radius of a cell. Radio resources such as time and transmission power may be consumed in proportion to the cyclic prefix length. Typically, a cyclic prefix length is predetermined and fixed in consideration of a radius of a cell, for example, a macrocell, when the system is set up. In this case, if mobile terminal 10 may use the cyclic prefix length, which is set up for the macrocell, to communicate with a smaller cell such as a femtocell, mobile terminal 10 will waste radio resources.

In order to overcome such a disadvantage, mobile terminal 10 may adaptively set up a cyclic prefix length based on transmission power of a base station, which is related to a radius of a cell, in accordance with an embodiment of the present invention. Particularly, mobile terminal 10 may set up a plurality of cyclic prefix lengths in advance. Mobile terminal 10 may select one of the plurality of cyclic prefix lengths according to a type of a base station, such as first base station 11 and second base station 12. When mobile terminal 10 accesses first base station 11 that has transmission power smaller than that of second base station 12, mobile terminal 100 may select a cyclic prefix length shorter than that used for second base station 12 having transmission power greater than that of first base station 11. A cyclic prefix having the selected prefix length may be inserted in a transmission frame. Particularly, the cyclic prefix may be inserted in a guard interval having a fixed length.

Hereinafter, an apparatus for adaptively setting up a cyclic prefix according to a type of a base station in accordance with an embodiment of the present invention will be described with reference to FIG. 2. The apparatus may be included in mobile terminal 10, but the present invention is not limited thereto.

Figure 2:
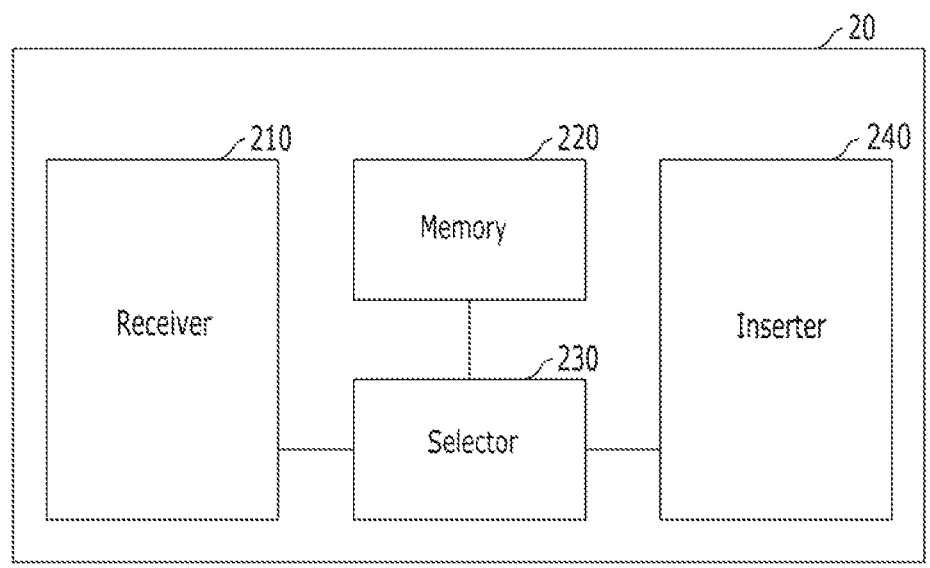
FIG. 2 shows an apparatus for adaptively setting up a cyclic prefix according to a type of a base station in accordance with an embodiment of the present invention.

FIG. 2 shows an apparatus for adaptively setting up a cyclic prefix according to a type of a base station in accordance with an embodiment of the present invention.

Referring to FIG. 2, apparatus 20 may include receiver 210, memory 220, selector 230, and inserter 240.

Receiver 210 may receive base station information from first and second base stations 11 and 12. The base station information may include at least one of information on transmission power of a related base station and information on a cell associated with the base station. For example, receiver 210 may receive base station information including a zone indicator, which is broadcast from a femtocell base station.

Memory unit 220 may store and manage a plurality of cyclic prefix lengths each having a different length from one another. The plurality of cyclic prefix lengths may be equal to or shorter than a length of a guard interval. Memory 220 may also store the received base station information and a plurality of cyclic prefix lengths. The received base station information may include information indicating a base station type. Such a base station type may be mapped to a corresponding cyclic prefix length.

Particularly, the plurality of cyclic prefix lengths may be previously determined and generated according to base station types or transmission powers, but the present invention is not limited thereto. For example, the plurality of cyclic prefix lengths may be generated based on other factors, such as varying radii of cells. The plurality of cyclic prefix lengths may be stored in a form of a set, such as a cyclic prefix length set. The cyclic prefix length set may include a plurality of cyclic prefix lengths $CP_1, CP_2, \ldots, CP_N$, which are different from each other, as given in the relation of Eq. 1 below. The plurality of cyclic prefix lengths may typically be generated so as to be equal to or shorter than a length of a guard interval.

$$CP=\{CP_1, CP_1, \ldots, CP_N\} \quad \text{Eq. 1}$$

The plurality of cyclic prefix lengths included in the cyclic prefix length set may be generated based on various factors, such as a radius of a base station, a base station type, transmission power of a base station, and delay spread in a cell, in advance. The present invention, however, is not limited thereto, and other factors may be considered to generate the plurality of cyclic prefix lengths.

Furthermore, the plurality of cyclic prefix lengths may be advantageously stored in a manner for mapping to associated information such as, for example, the received base station information. The received base station information may include, for example, information on transmission power, a base station type, a base station identifier, a cell identifier, and a zone indicator.

Selector 230 may select one of the cyclic prefix lengths based on the received base station information and mapping relation between a base station type and a cyclic prefix length. For example, selector 230 may select one from a cyclic prefix length set stored in memory 220 based on the base station information received from at least one of first and second base stations 11 and 12. That is, selector 230 may determine a base station type based on the base station information and select a cyclic prefix length corresponding to the base station type from the plurality of cyclic prefix lengths stored in memory 220. The plurality of cyclic prefix lengths, included in the cyclic prefix length set, may be mapped to associated transmission power of a base station. In this case, selector 230 may select a cyclic prefix length based on the transmission power. Information on the transmission power may be included in the base station information received from first and second base stations 11 and 12.

Inserter 240 may copy a portion of a symbol to generate the selected cyclic prefix length and insert the copied portion of the symbol into a guard interval of a transmission frame, as a cyclic prefix. That is, inserter 240 may insert a cyclic prefix having the selected cyclic prefix length in the guard interval of the transmission frame. Then, mobile terminal 10 may transmit the transmission frame with the cyclic prefix inserted to at least one of first and second base stations 11 and 12.

As described above, apparatus 20 may adaptively select a cyclic prefix length according to a base station type and insert a cyclic prefix having the selected cyclic prefix length in the guard interval. For example, apparatus 20 may adaptively select one of the plurality of predetermined cyclic prefix lengths according to the base station information, for example, transmission power, a cell radius, a base station identifier, a base station type, and a zone indicator. That is, apparatus 20 may select a comparatively short cyclic prefix length when mobile terminal 10 accesses a base station having a short communication range, such as a femtocell. Apparatus 20 may select a comparatively long cyclic prefix length when mobile terminal 10 accesses a base station having a long communication range, such as a macrocell. Since mobile terminal 10 uses a cyclic prefix length adjusted according to an associated base station, radio resources can be saved, power consumption can be reduced, and ISI/ICI can be reduced. Accordingly, mobile terminal 10 may not waste radio resources such as time and transmission power, when a cyclic prefix length is employed that is longer than is necessary.

Furthermore, mobile terminal 10 may maintain the fixed length of the guard interval regardless of the base station type. That is, synchronization may be maintained and a handover process may be performed without causing interruption although the cyclic prefix length is adaptively changed according to the base station type.

Figure 3:
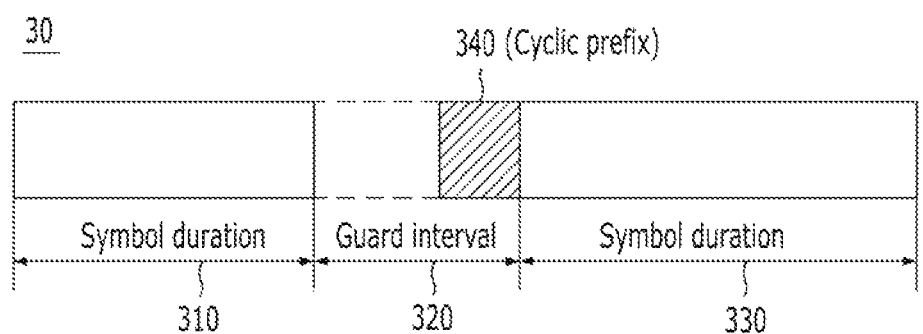
FIG. 3 shows an OFDM transmission frame in accordance with an embodiment of the present invention.

FIG. 3 shows an OFDM transmission frame in accordance with an embodiment of the present invention.

Referring to FIG. 3, a transmission frame 30 may include symbol durations 310 and 330 and guard interval 320. Symbol durations 310 and 330 may be data transmission duration. Guard interval 320 may be interposed between symbol durations 310 and 330. Apparatus 20 may insert cyclic prefix 340 in guard interval 320, as shown in FIG. 3.

Apparatus 20 may copy a last portion of a data symbol, which may be an OFDM symbol transmitted, and use the copied portion as cyclic prefix 340. Apparatus 20 may adaptively control a length of cyclic prefix 340 while maintaining a consistent, or constant, length of guard interval 320. That is, the length of a cyclic prefix may be changed according to a type of a base station but the length of the guard interval may be maintained consistently in accordance with an embodiment of the present invention.

Apparatus 20 may select a length of cyclic prefix 340 from a cyclic prefix length set based on base station information received from first and second base stations 11 and 12. The base station information may include a base station type, transmission power, and cell information. Furthermore, apparatus 20 may obtain the base station information from a signal received from first and second base stations 11 and 12. For example, mobile terminal 10 may scan and receive signals transmitted from an associated base station in a listening mode and extract the base station information from the received signal. Such signal may be a pilot signal broadcast from a base station.

Apparatus 20 may select one of cyclic prefix lengths in a cyclic prefix length set based on a communication distance to first and second base stations 11 and 12. Apparatus 20 may insert the cyclic prefix with the selected length in guard interval 340. For example, apparatus 20 may insert, in guard interval 320, cyclic prefix 340 with a comparatively short cyclic prefix length when mobile terminal 10 accesses a base station having a short communication range, such as a femtocell. Apparatus 20 may insert, in guard interval 320, cyclic prefix 340 with a comparatively long cyclic prefix length when mobile terminal 10 accesses a base station having a long communication range, such as a macrocell.

As described above, apparatus 20 may adaptively select a length of cyclic prefix 340 according to a base station type and insert cyclic prefix 340 having the selected length in guard interval 320 of transmission frame 30. Accordingly, interference may be reduced and orthogonality may be maintained while mobile terminal 10 communicates with at least one of first and second base stations 11 and 12. Hereinafter, an operation of apparatus 20 will be described with reference to FIG. 4.

Figure 4:
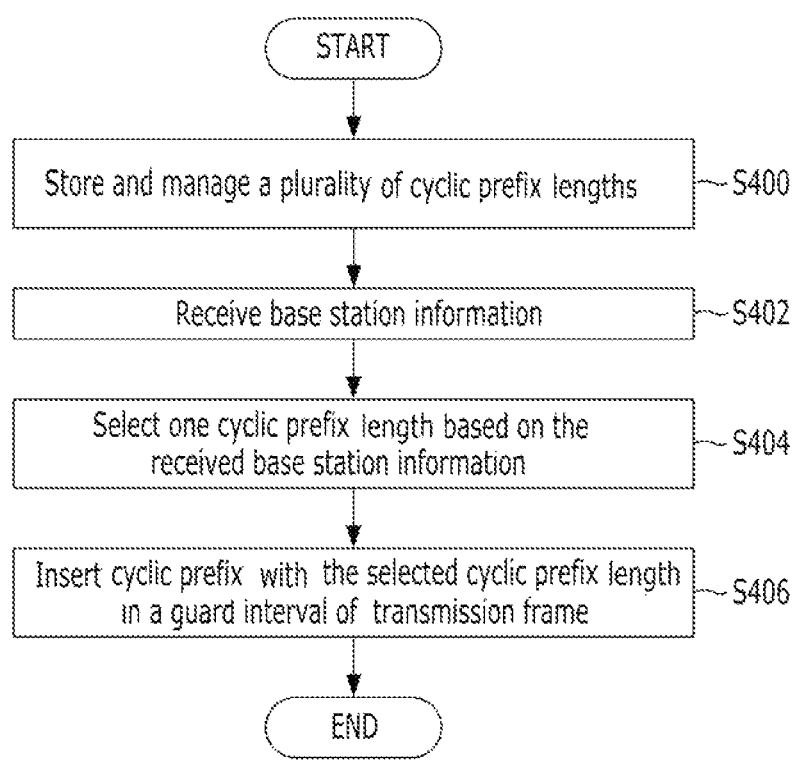
FIG. 4 shows a method for adaptively setting up a cyclic prefix length based on a type of a base station in accordance with an embodiment of the present invention.

FIG. 4 shows a method for adaptively setting up a cyclic prefix length based on a type of a base station in accordance with an embodiment of the present invention.

Referring to FIG. 4, a plurality of cyclic prefix lengths may be stored and managed at step S400. For example, the plurality of cyclic prefix lengths may be stored in a form of a cyclic prefix length set. The cyclic prefix length set may include a plurality of cyclic prefix lengths associated with base station information such as a base station type and a transmission power.

Prior to storing and managing, the plurality of cyclic prefix lengths included in the cyclic prefix length set may be determined according to various factors such as a base station type, a cell size, and delay spread. Particularly, the plurality of cyclic prefix lengths may be determined based on delay spread in a corresponding cell area. For example, delay spread is in proportional to a propagation distance of a signal, a cyclic prefix length of second base station 12 may be longer than that of first base station 11 because a cell area of second base station 12 is wider than that of first base station 11. For example, mobile terminal 10 may previously set up cyclic prefix lengths according to base station types, group the determined cyclic prefix lengths as a cyclic prefix length set, and store the cyclic prefix length set in memory 220.

After preparing the cyclic prefix length set, mobile terminal 10 may receive base station information from a serving base station and determine a type of a base station based on the received base station information. For example, the base station information may be a transmission power of a base station. Mobile terminal 10 may select one from the cyclic prefix length set according to the determined base station type.

For example, first base station 11 and second base station 12 may have a difference in transmission power. Mobile terminal 10 may determine first base station 11 and second base station 12 as different types of base stations because the transmission power difference. Accordingly, mobile terminal 10 may select two different cyclic prefix lengths according to the type of first base station 11 and the type of second base station 12.

At step S402, base station information may be received. For example, mobile terminal 10 may receive base station information from a serving base station such as first base station 11 as shown in FIG. 1. The serving base station may be a base station currently being accessed and providing a related service. That is, mobile terminal 10 may be located within a cell managed by the serving base station. Mobile terminal 10 may receive base station information including an indicator, which is broadcast from first base station 11. The base station information may include at least one of information on a transmission power of first base station 11 and information on a cell of first base station 11. For example, when mobile terminal 10 receives base station information including a zone indicator from first base station 11, mobile terminal 10 may determine that a type of first base station 11 is a femtocell base station because of a zone indicator. Accordingly, based on the signal, mobile terminal 10 may be aware that first base station 11 is a femtocell base station having a certain radius of a femtocell.

At step S404, a cyclic prefix length may be selected from a cyclic prefix length set based on the received base station information. For example, mobile terminal 10 may select one from the cyclic prefix length set based on the received base station. Particularly, mobile terminal 10 may determine a base station type based on the received base station information. Mobile terminal 10 may select a cyclic prefix length corresponding to the base station type from the cyclic prefix length set.

At step S406, a cyclic prefix having the selected length may be inserted in a guard interval of a transmission frame. For example, mobile terminal 10 may copy a last portion of a transmission data symbol as long as the selected cyclic prefix length and insert the copied portion in a guard interval. Mobile terminal 10 may consistently maintain the length of the guard interval although the length of a cyclic prefix length varies according to a type of a base station.

As described above, a cyclic prefix length may be adaptively generated according to a type of a base station in accordance with an embodiment of the present invention. Particularly, a comparatively shot cyclic prefix may be used in a mobile terminal in a cell with a small radius, such as a femtocell. Since the mobile terminal uses a short cyclic prefix, power consumption of mobile terminal may be reduced. Furthermore, interference to an adjacent cell may be decreased.

As described above, a length of a guard interval may be constantly maintained regardless of a type of base station. Accordingly, handover may be performed without causing problem although the cyclic prefix length is changed.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for adaptively setting a prefix length in communication with a base station, the method comprising:
   receiving base station information from the base station;
   determining the prefix length based on the received base station information; and
   inserting a cyclic prefix in a transmission frame with the determined prefix length,
   wherein the determining includes:
      determining a type of the base station based on the received base station information; and
      setting the prefix length according to the type of the base station, and
   wherein the setting the prefix length includes:
      setting a comparatively short prefix length when the type of the base station is a femtocell base station; and
      setting a comparatively long prefix length when the type of the base station is a macrocell base station.

2. The method of claim 1, wherein the determining the type of the base station is based on at least one of a base station identifier, a cell identifier, and a zone indicator, included in the received base station information.

3. The method of claim 1, wherein the inserting the cyclic prefix includes:
   copying a portion of a symbol of the determined prefix length; and
   inserting the copied portion in a guard interval of the transmission frame.

4. The method of claim 3, wherein a length of the guard interval is maintained constantly regardless of the determined prefix length.

5. The method of claim 1, wherein the cyclic prefix is a cyclic prefix of an OFDM wireless communication system.

6. A method for adaptively setting a prefix length in communication with a base station, the method comprising:
   receiving base station information from the base station;
   determining the prefix length based on the received base station information; and inserting a cyclic prefix in a transmission frame with the determined prefix length,
   wherein the determining the prefix length includes:
   determining a communication distance of the base station based on the received base station information; and
   setting the prefix length differently according to the determined communication distance of the base station.

7. The method of claim 6, wherein the setting the prefix length includes:
   setting a comparatively short prefix length when the communication distance is comparatively short; and
   setting a comparatively long prefix length when the communication distance is comparatively long.

8. The method of claim 6, wherein the communication distance is determined based on at least one of transmission power of the base station, a cell radius of the base station, delay spread in a cell of the base station, and a cell identifier of the base station, which are included in the received base station information.

9. A method for adaptively setting a prefix length, the method comprising:
receiving base station information from a base station;
selecting at least one from a plurality of prefix lengths based on the received base station information; and
inserting a cyclic prefix in a transmission frame with the selected prefix length and transmitting signals using the transmission frame,
wherein:
the received base station information includes information of at least one of transmission power, a cell radius, a base station identifier, a cell identifier associated with the base station, delay spread in a cell of a base station, and a zone indicator.

10. The method of 9, prior to the receiving, further comprising:
determining the plurality of prefix lengths according to a type of the base station; and
storing the plurality of determined prefix lengths associated with each type of base station in a memory.

11. The method of claim 10, wherein the selecting includes:
determining a type of the base station based on the received base station information; and
selecting as the prefix length a prefix length associated with the determined type of the base station from the plurality of prefix lengths stored in the memory.

12. The method of claim 10, wherein the plurality of prefix lengths are stored as a prefix length set, the method comprising mapping each prefix length to each type of a base station.

13. The method of claim 10, wherein the determining includes:
determining a comparatively short prefix length for a femtocell base station and mapping the comparatively short prefix length to the femtocell base station; and
determining a comparatively long prefix length for a macrocell base station and mapping the comparatively long prefix length to a macrocell base station.

14. The method of claim 13, wherein the selecting includes:
determining a type of the base station based on at least one of a cell identifier, a base station identifier, and a zone indicator, which are included in the received base station; and
finding a prefix length mapped to the determined type of the base station from the plurality of prefix lengths stored in the memory.

15. An apparatus for adaptively setting a prefix length, the apparatus comprising:
a memory configured to store and to manage a plurality of prefix lengths associated with base station types
a receiver configured to receive base station information from a base station;
a selector configured to select a prefix length from the plurality of prefix length based on the received base station information; and
an inserter configured to insert a cyclic prefix having the determined prefix length in a guard interval of a transmission frame,
wherein the plurality of prefix lengths are:
previously determined by determining a comparatively short prefix length for a femtocell base station and mapping the comparatively short prefix length to the femtocell base station, and determining a comparatively long prefix length for a macrocell base station and mapping the comparatively long prefix length to a macrocell base station; and
stored in the memory in as a prefix length set.

16. The apparatus of claim 15, wherein the selector is configured to:
determine the base station type based on at least one of a base station identifier, a cell identifier, and a zone indicator, included in the received base station information; and
find a prefix length mapped to the determined base station type from the plurality of prefix lengths stored in the memory.

* * * * *